US008103669B2

(12) United States Patent
Castellani et al.

(10) Patent No.: US 8,103,669 B2
(45) Date of Patent: Jan. 24, 2012

(54) SYSTEM AND METHOD FOR SEMI-AUTOMATIC CREATION AND MAINTENANCE OF QUERY EXPANSION RULES

(75) Inventors: Stefania Castellani, Meylan (FR);
Aaron N. Kaplan, Grenoble (FR);
Frederic Roulland, Le Versoud (FR);
Jutta K. Willamowski, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 581 days.

(21) Appl. No.: 12/126,115

(22) Filed: May 23, 2008

(65) Prior Publication Data

US 2009/0292700 A1 Nov. 26, 2009

(51) Int. Cl.
*G06F 17/30* (2006.01)
*G06F 7/00* (2006.01)
(52) U.S. Cl. ............... 707/736; 707/802; 707/758
(58) Field of Classification Search .......... 707/758, 707/802, 736
See application file for complete search history.

(56) References Cited

U.S. PATENT DOCUMENTS

| | | | |
|---|---|---|---|
| 4,839,853 | A | 6/1989 | Deerwester et al. |
| 5,283,737 | A * | 2/1994 | Van Praag .................. 704/9 |
| 6,564,213 | B1 | 5/2003 | Ortega et al. |
| 7,058,567 | B2 | 6/2006 | Aït-Mokhtar et al. |
| 7,310,615 | B2 * | 12/2007 | Lewis ........................ 705/35 |
| 2005/0132169 | A1 * | 6/2005 | Mates ........................ 712/208 |
| 2007/0179776 | A1 | 8/2007 | Segond et al. |
| 2007/0192085 | A1 | 8/2007 | Roulland et al. |
| 2009/0006359 | A1 * | 1/2009 | Liao .......................... 707/5 |

OTHER PUBLICATIONS

U.S. Appl. No. 11/544,200, filed Oct. 6, 2006, Roulland, et al.
U.S. Appl. No. 11/805,456, filed Jul. 16, 2007, Castellani, et al.
U.S. Appl. No. 11/875,183, filed Oct. 19, 2007, Roulland, et al.
E.Amitay, et al., *Queries as Anchors: Selection by Association*, In Proc. of HT'05, Salzburg, Austria, Sep. 6-9, 2005.
Y.Qiu, et al., *Concept Based Query Expansion*, In Proc. of SIGIR'93, Pittsburgh, Jun. 1993.
M.Baroni, et al., *Using Co-occurrence Statistics and the Web to Discover Synonyms in a Technical Language*, In Proc. of LREC'04, Lisbon: ELDA. 1725-1728, 2004.
S.Cucerzan, et al., *Extracting Semantically Related Queries by Exploiting User Session Information*, Microsoft Research Technical Report, 2005.
R.Jones, et al., *Generating Query Substitutions*, In Proc. of WWW'06, Edinburgh, Scotland, May 23-26, 2006.
F.Roulland, et al., *Query Reformulation and Refinement Using NLP-Based Sentence Clustering*, In Proc. of the 29$^{th}$ European Conference on Information Retrieval (ECIR), Rome, Italy, Apr. 2007.
P.D.Turney, *Mining the Web for Synonyms: PMI-IR versus LSA on TOEFL*, In Proc. of the 12$^{th}$ European Conference on Machine Learning (ECML'01), Freiburg, Germany, pp. 491-502, 2001.

* cited by examiner

*Primary Examiner* — Kuen Lu
(74) *Attorney, Agent, or Firm* — Fay Sharpe LLP (57) ABSTRACT

A system and method enable semi-automated generation of query expansion rules for searching a knowledge base. Candidate synonymy pairs are automatically extracted from queries made by users when searching a knowledge base. Synonymy rules are defined, based on the extracted candidate synonymy pairs, and may be context dependent. Query expansion rules based on the defined synonymy rules can then be exported to a storage medium for use in expansion of new user queries when searching the knowledge base.

23 Claims, 8 Drawing Sheets

| Query Te... | Underst... | Fq |
|---|---|---|
| print | copy | 26 |
| copy | print | 11 |
| error | fault | 22 |
| fault | error | 5 |
| scanner | scan | 20 |
| scan | scanner | 14 |
| config | configur... | 19 |
| email | scan | 17 |
| scan | email | 10 |
| email | e-mail | 16 |
| code | password | 15 |
| password | code | 5 |
| ndp | novell | 13 |
| admin | password | 13 |
| printer | print | 13 |
| print | printer | 6 |
| smtp | email | 12 |
| email | smtp | 11 |

1226 Candidates.

◯ Output ● Impact error
total number of documents = 251
number of documents without [fault] = 241
total number of matching cases = 359
number of matching cases without [fault] = 229

Found Context for fault (174)

| Context | Fq |
|---|---|
| relate fault code | 354 |
| fault code | 17 |
| fault | 15 |
| scanner fault | 8 |
| system fault | 5 |
| area 2 fault | 4 |
| detect fault | 4 |
| finisher fault | 4 |
| late finisher entranc... | 4 |
| not in_position fault | 4 |
| poor stack fault | 4 |
| communication fault | 3 |

Selected Contexts (1)

| Context | Fq |
|---|---|
| gfi (ground fault interr... | 1 |

Require One ▼   All Current Matches

[Solution]
Electrical and Power Specifications
GFI (Ground Fault Interrupter) for
unbalanced surge protection.
94

1 new cases (1 sentences in 1 new documents)
contain the selected context.

fault
total number of documents = 619
number of documents without [error] = 609
total number of matching cases = 563
number of new matching cases = 433

90

96

```
AUTOMATIC DOCUMENT FEEDER
CLOSE THE HIGH CAPACITY FEEDER
DOCUMENT FEEDER
FEEDER
HIGH CAPACITY FEEDER
USING THE DOCUMENT FEEDER
```

FIG. 8A

```
FEEDER
    DOCUMENT FEEDER
        AUTOMATIC DOCUMENT FEEDER
        USING THE DOCUMENT FEEDER
    HIGH CAPACITY FEEDER
        CLOSE THE HIGH CAPACITY FEEDER
```

SYSTEM AND METHOD FOR SEMI-AUTOMATIC CREATION AND MAINTENANCE OF QUERY EXPANSION RULES

CROSS REFERENCE TO RELATED PATENTS AND APPLICATIONS

The following copending applications, the disclosures of which are incorporated herein in their entireties by reference, are mentioned:

U.S. application Ser. No. 11/544,200, filed Oct. 6, 2006, entitled NAVIGATION SYSTEM FOR TEXT, by Frederic Roulland, et al.; and U.S. application Ser. No. 11/875,183, entitled REAL-TIME QUERY SUGGESTION IN A TROUBLE SHOOTING CONTEXT, filed Oct. 19, 2007, by Frederic Roulland, et al.

BACKGROUND

The exemplary embodiment relates to the linguistic processing arts. It finds particular application in conjunction with the creation of query expansion rules for knowledge base searching. However, it is to be appreciated that it is also amenable to other like applications.

Synonyms are useful in several contexts. For example, in information search systems, such as a device troubleshooting search engine, there is the need for the creation and maintenance of query expansion rules based on synonyms since the terminology used in the searchable content of a knowledge base is often different from the terminology used by the users of the search system. Troubleshooting systems with natural language query based user interaction usually provide efficient results only if the user has some expertise of the terminology used in the underlying knowledge base and is able to choose "good" words in the query. For example, technical terminology may be used, such as names of mechanical parts, operations on them, configuration settings, etc., which are often unfamiliar to the knowledge base users.

There is a great deal of literature in the field of information retrieval (IR) on techniques for what is generally referred to as query expansion. This term is used to describe techniques used in vector space IR models or Boolean search engines with an OR operator, when adding more words to a query results in more results being retrieved (and may also improve the ranking). These techniques involve supplementing the original query with additional words that are related to those originally entered by the user. The expansion may be performed interactively, where the user is asked to select relevant words or documents, or automatically, where the system expands the query "behind the scenes."

In order to be useful, synonyms need to be defined precisely and selectively. In practice, a generic list of synonyms for natural languages may in some cases be missing domain-specific synonymies and in others introduce noise in the results when searching for a given type of information. In many instances it is impractical or difficult for an editor of the knowledge base to develop a collection of synonyms for each of the terms used in the knowledge base which can then be used to develop expansion rules for expanding a user's query. The editor may be unfamiliar with domain-specific terms. In addition, the editor generally needs to spend time evaluating whether the addition of new synonyms will have a negative impact on the search results by generating a large number of responses which would not be particularly relevant for a user. Accordingly, most knowledge bases have only a limited number of query expansion rules which allow substitution of one or more synonyms for a queried term.

The exemplary embodiment provides a method for developing query expansion rules which can be performed in at least a semi-automated manner, to improve searching of a structured knowledge base, such as a manual for troubleshooting of faults with electromechanical devices.

INCORPORATION BY REFERENCE

The following references, the disclosures of which are incorporated herein in their entireties by reference, are mentioned.

U.S. Pub. No. 2007/0192085, published Aug. 16, 2007, entitled NATURAL LANGUAGE PROCESSING FOR DEVELOPING QUERIES, by Frederic Roulland, et al., discloses a system suited to self-troubleshooting a problem. The system includes a processor which identifies normalized forms of at least some of the words of a natural language user query input by a user. The user query may describe a problem experienced with a machine, such as a printer. The processor retrieves text strings which may comprise problem statements stored in memory. Each retrieved problem statement includes at least one word with a normalized form which is recognized by the processor as being equivalent to one of the identified normalized forms. Each of the retrieved problem statements may be associated with at least one solution sequence for addressing the problem with the machine. In the event that the stored problem statements in memory are not fully responsive, the processor provides one or more options for refinement of the user query based on tags associated with those words of the problem statements which are responsive.

U.S. Pat. No. 7,058,567, issued Jun. 6, 2006, entitled NATURAL LANGUAGE PARSER, by Aït-Mokhtar, et al., discloses a parser for syntactically analyzing an input string of text. The parser applies a plurality of rules which describe syntactic properties of the language of the input string.

U.S. Pat. No. 4,839,853, entitled COMPUTER INFORMATION RETRIEVAL USING LATENT SEMANTIC STRUCTURE, by Deerwester, et al., assumes that there is an underlying latent semantic structure in word usage data that is partially hidden or obscured by the variability of word choice. A statistical approach is utilized to estimate this latent structure and uncover the latent meaning. Words, the text objects and, later, user queries are processed to extract this underlying meaning and the new, latent semantic structure domain is then used to represent and retrieve information.

U.S. Pub. No. 20070179776, entitled LINGUISTIC USER INTERFACE, by Frederique Segond, et al., discloses a system for retrieval of text. A processor identifies grammar rules associated with text fragments of a text string that is retrieved from an associated storage medium, and retrieves text strings from the storage medium which satisfy the grammar rules. A display displays retrieved text strings. A user input device in communication with the processor enables a user to select text fragments of the displayed text strings for generating a query. The processor identifies grammar rules associated with the user-selected text fragments and retrieves text strings from the storage medium which satisfy the grammar rules.

BRIEF DESCRIPTION

In accordance with one aspect of the exemplary embodiment, a semi-automated system for generating query expansion rules includes a candidate detection module, which automatically extracts candidate synonymy pairs from expressions used by users in queries when searching an associated knowledge base. An interactive definition module is provided for defining synonymy rules based on the extracted candidate synonymy pairs. A synonymy rule export module exports query expansion rules based on the defined synonymy rules to a storage medium for use in expansion of user queries when searching the knowledge base.

In another aspect, a method for generating query expansion rules includes automatically extracting candidate synonymy pairs from expressions used by users in queries when searching a knowledge base. The method further includes providing for interactive definition of synonymy rules based on the extracted candidate synonymy pairs and for contextualizing the synonymy rules. The method further includes exporting query expansion rules based on the defined synonymy rules to a storage medium for use in expansion of user queries when searching the knowledge base.

In another aspect, a method for query expansion includes providing a log for each of a plurality of prior sessions in which a user searches a knowledge base. Each session log includes a user query and a reformulated user query. For at least one of the logs, the method includes automatically extracting a candidate synonymy pair from the user query and reformulated user query. The candidate synonymy pair includes a first term extracted from the user query and a second term extracted from the reformulated query. A synonymy rule is defined, based on the extracted candidate synonymy pair and optionally a context restriction. A query expansion rule based on the defined synonymy rule is applied to a new user query when searching the knowledge base.

DETAILED DESCRIPTION

The exemplary embodiment provides a synonymy system and a method for generating synonymy relations. The system bridges the gap between the search terms used by users of a knowledge base and terms used by the knowledge base editors. In particular, it enables synonyms of terms of a user's query to be automatically identified, which can then be used for developing query expansion rules for information searching. The synonymy system provides semi-automatic support for the knowledge base editors to generate and maintain synonymy rules to improve results of searches performed by knowledge base users.

Briefly, candidates for synonymy are identified from expressions used by past users when searching the knowledge base. The editors of the knowledge base are then provided with facilities to evaluate these candidate synonyms and to specify contextualized synonymy rules based thereon.

The exemplary synonymy system and method find particular application in information search systems, such as a search engine designed to assist a user in troubleshooting a problem with a device or which provides information on the operation of the device. While the embodiment is described in the context of an image reproduction device such as a printer, photocopier, or multifunction device, it is to be appreciated that the device can be any electromechanical device, e.g., vehicles, audio and visual equipment, such as cameras, video recorders, cell phones, dictation devices, music systems, computing devices, such as personal computers, household appliances, and the like. Examples from the troubleshooting domain will be used for illustration purposes but the same method can be equally applied to other domains.

In the exemplary synonymy system and method, candidates for synonymy are automatically identified from expressions used by users in queries when searching the knowledge base. These candidates for synonymy can be expressed by (problematic term, replacing term) pairs where both problematic and replacing terms are derived from reformulations in user queries. Each term in the pair may comprise one or more words. A knowledge base editor can evaluate the potential impact of each candidate for synonymy on search results and accept or reject it. For a candidate that is accepted, the editor can specify one or more contextual constraints that must be satisfied in order for the rule to apply. In one embodiment, users can also enter their own synonymy candidates and evaluate them.

The word "synonym" can thus refer to a term, such as a word or phrase, which occurs in a user's query and which is considered equivalent to a term in the knowledge base, or vice versa. It may have the same or similar meaning to the knowledge base term, but this is not required. Some may not be considered synonyms in conventional usage, outside the specific domain in which the knowledge base operates. Thus, at least some of the candidates for synonymy are problematic term, replacement term pairs which do not have the same lemma form (for example, the terms 'code, password' do not have the same lemma form, whereas 'printing, print' have the same lemma, 'print').

A 'synonymy rule' is a type of query expansion rule which generally specifies a (problematic term, replacing term) pair and optionally a constraint on context. The context constraint can specify another term which is required to be associated/not associated with the problematic term and/or replacing term for the query expansion rule to be applied.

An 'editor' can be any human user of the exemplary synonymy system.

A "knowledge base" can be any electronic database containing searchable text in a natural language, such as English or French. It may be a structured database. In the specific examples described herein, it includes problem statements, which may each be a short description of a known problem with a printer, and one or more associated solution statements which describe steps for solving the problem. More generally, these problem statements and/or solution statements may be considered as 'documents.' The knowledge base may be indexed according to the content of documents, e.g., the problem statements only, or the content of both the problem statements and solutions. A search engine can be configured for retrieving documents which include one or more words of the user's query and presenting them to the user in a ranked order. When the user finds a problem statement/solution which addresses a perceived problem, the user may review the proposed solution statement and then end the query session. If the search engine does not retrieve any responsive documents, the user may try another query and so on through several iterations until the user finds what he is looking for and ends the session, or ends the session without doing so.

Figure 1:
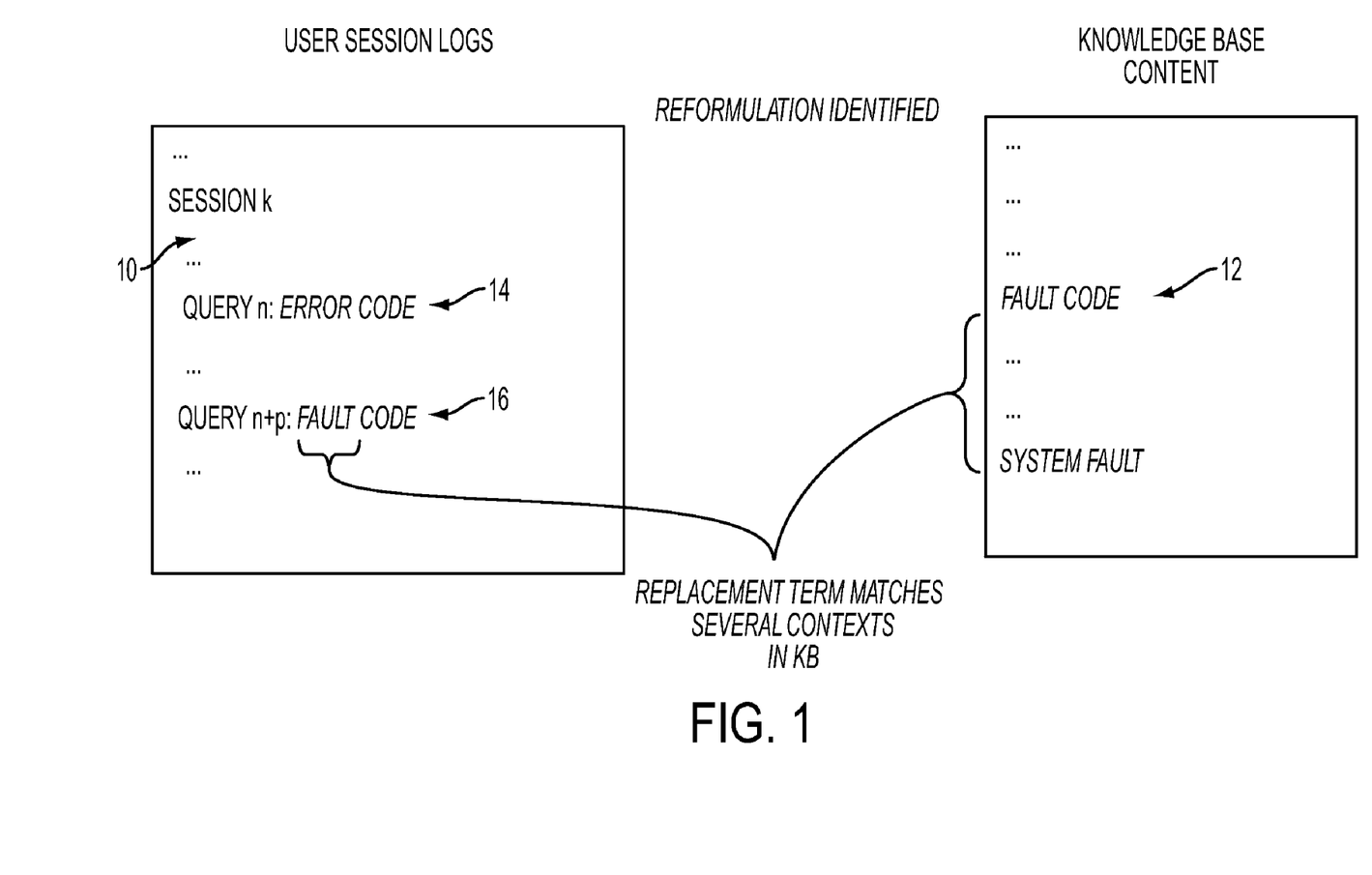
FIG. 1 illustrates part of a log recording a user's session with a knowledge base.

By way of example, FIG. 1 illustrates part of an exemplary log 10 of a user session in which a user interacts with a search engine to query a knowledge base with the aim of retrieving knowledge base content. Content 12 of the knowledge base is also shown, to illustrate the links between problematic terms and replacement terms in the knowledge base. In the session denoted k, the user has entered the query 'error code' as the nth query 14. At the time the session took place, it is likely that this expression is not in the searchable content of the knowledge base (nor are there any applicable query expansion rules) or that the results of the corresponding search are not satisfactory. The knowledge base does, however, include one of the words: 'code.' The user may reformulate the query several times during the course of a user session. In one of the reformulations (n+p) 16, the user enters 'fault code,' which happens to be in the knowledge base. In the exemplary embodiment, a synonymy candidate (T1, T2) can be expressed by (error, fault), where 'error' is considered the problematic term and "fault" the replacing term. As seen from this example, the two terms need not be the full user query but only the parts which differ between a query 14 and a reformulation 16. In one embodiment, any subsequent query ("second query") in a user session is considered as a reformulation of an earlier query ("first query"), although shorter time windows could be considered. A session may be considered to end when the user logs off the system or when there is no interaction with the system for at least a predetermined time period. As will be appreciated, the first query is not necessarily the first query of a session, although it may be, and the second query is not necessarily the immediately subsequent query in time, although it may be.

Figure 2:
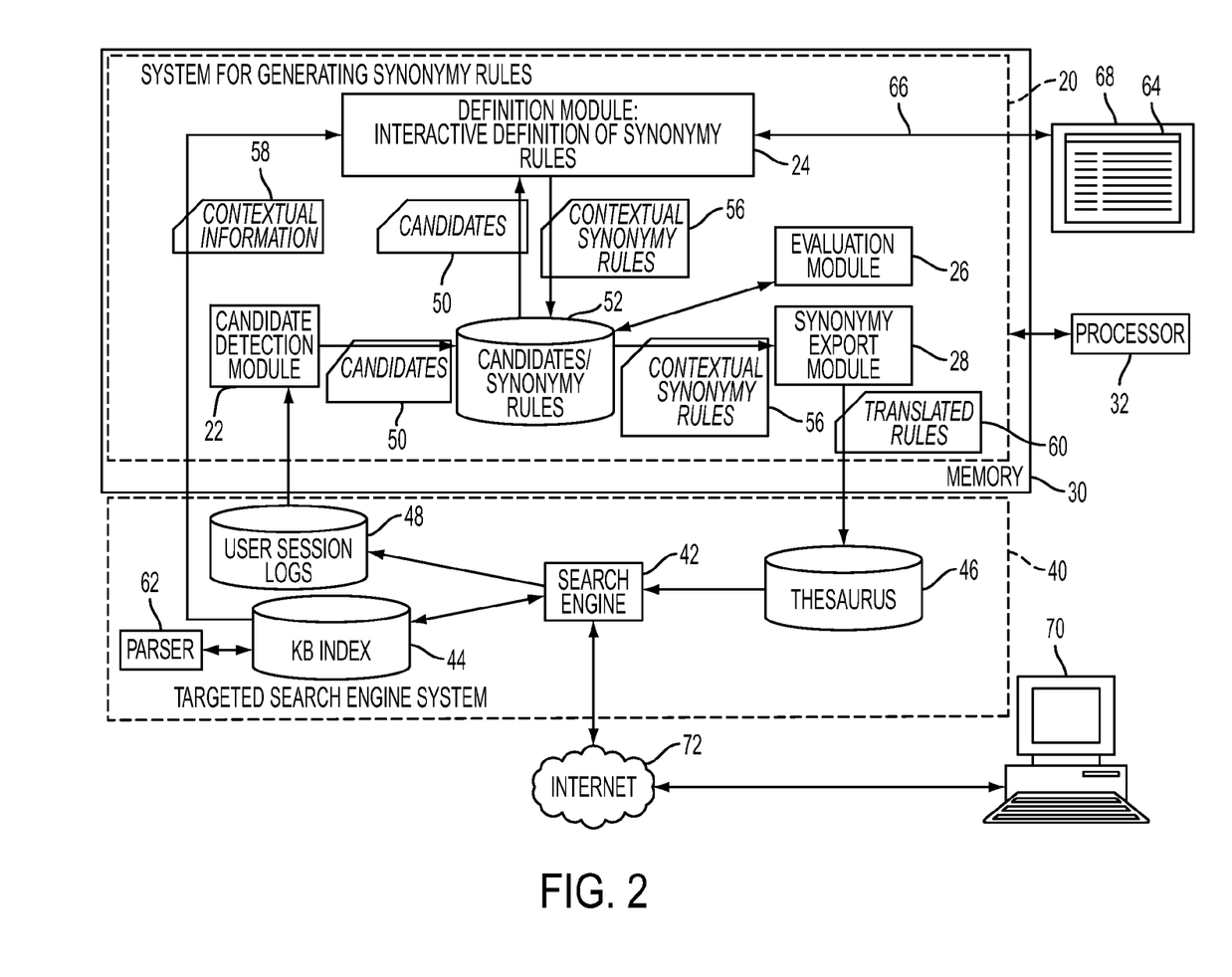
FIG. 2 is a functional block diagram of a system for generating candidate synonyms and synonymy relations for query expansion.

With reference now to FIG. 2, an exemplary environment, in which a synonymy system 20 for generating synonymy rules operates, is shown. The synonymy system 20 includes processing modules 22, 24, 26, 28 for candidate detection, definition of synonymy rules, evaluation of synonymy rules, and synonymy rule export, respectively. The modules 22, 24, 26, 28 may be embodied in software, hardware, or a combination thereof. In the exemplary embodiment, the modules 22, 24, 26, 28 are hosted by one or more computing devices, such as a general purpose computing device, e.g., a desktop or laptop computer or a dedicated device, such as a server. The modules 22, 24, 26, 28 may comprise software instructions stored in memory 30 of the computer and which are executed by an associated processor 32. As will be appreciated, some of the modules may be combined or distributed over multiple computing devices.

The synonymy system 20 interacts with a targeted search engine system 40 which includes a search engine 42 with access to an index of a knowledge base 44 and a thesaurus 46 comprising a set of query expansion rules, both which may be stored in a storage medium, either locally or remote from the search engine. The thesaurus 46 may comprise any suitable data structure(s) in which the query expansion rules are stored and are accessible to the search engine 42. Logs 48 of user sessions (as exemplified in FIG. 1) are generated by the search engine 42 and stored in data memory. The search engine 40 may be hosted by one or more computing device(s), such as a server, which can be the same or a different computing device from that hosting the exemplary synonymy system 20 and may be linked thereto by appropriate wired or wireless links.

The candidate detection module 22 collects user sessions 48 logged by the search engine 42 and processes them in order to extract a list of candidates for synonymy 50. These candidates for synonymy may be stored internally in the synonymy system 20, e.g., in data memory 52, and can be subsequently accessed by the other modules 24, 26, 28 or updated with a subsequent run of the candidate detection module 22 on new user session logs.

The interactive definition module 24 facilitates interactive definition of synonymy rules and provides a GUI (Graphical User Interface), which assists an editor in defining new or modified synonymy rules based on the collected candidates 50. The interactive definition module 24 retrieves, from the knowledge base 44, sentences and information for identifying syntactic contexts 58 in which a candidate 50 could impact a search. This information is presented to the user, who can then generate a context dependent (or context free) synonymy rule 56 from a candidate 50. This rule is stored internally in the synonymy system 20, e.g., in data memory 52. The evaluation module 26, which may form a part of the interactive definition module 24, tests the new rule to evaluate its impact on knowledge base searches. The synonymy export module 28 converts the rules into an appropriate format for processing by the targeted search engine 40 and exports the generated rules 60 to the targeted search engine thesaurus 46.

In the exemplary embodiment, the environment includes a parser 62 which identifies groups of syntactically coherent expressions (contexts 58) in the knowledge base content, so that related expressions may be presented to the editor as a group. The parser may 62 be utilized initially on the content of the knowledge base 44 and its output used to index the knowledge base content, and periodically thereafter, e.g., when new content is added. An exemplary parser which may be utilized is the Xerox Incremental Parser (XIP), which is described in U.S. Pat. No. 7,058,567, entitled NATURAL LANGUAGE PARSER, by Aït-Mokhtar, et al. Such a parser may be modified to identify syntactically coherent expressions as described in U.S. application Ser. Nos. 11/544,200 and 11/875,183, incorporated herein by reference in their entireties.

An editor may interact with the synonymy system 20 via a user interface 64, such as a graphical user interface (GUI), which is linked to the synonymy system via a suitable wired or wireless link 66. GUI 64 may include a display 68, such as a screen, and a user input device (not shown), such as a touch screen, keyboard, keypad, cursor control device, such as a mouse, track ball, pen, touch pad, or a touch screen, stylus, or combination thereof, by which a user can select candidates for synonymy and contextual constraints. The user interface 64 can be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like, such as incorporated into a workstation of a computer network or other computer device such as a personal computer or mobile computer device, such as a PDA, a cell phone, a Tablet PC, a Pocket PC, or other suitable electronic device.

Users of the search engine 40 who do not have editing authority may interact with the search engine via a web browser displayed on the display of a conventional computing device 70, which may be linked to the search engine via a suitable wired or wireless link 72, e.g., over a network, such as a LAN, WLAN, or the Internet.

The synonymy system 20 may be used at the initial deployment of the knowledge base 44. It may be used to provide support to the knowledge base editors to evaluate opportunities for the generation of new query expansion rules from other knowledge base system usage logs. It may also be used when new content has to be created and added to the knowledge base by an editor. It may be used periodically or whenever a need for better terminology is detected either automatically or because of user feedback (e.g., a request from a troubleshooter of a call center). When new content has to be created and added to the knowledge base 44, the synonymy system 20 may support the knowledge base editor in checking whether the new content also calls for modifications of the existing thesaurus 46, e.g., by listing all the rules that apply to the new text. Then, the synonymy system can be used periodically to check whether user terminology is still adequately supported by the knowledge base. If not, or if a problem is detected, the synonymy system can assist in determining whether adding new synonymy rules or modifying existing ones would help to link unsupported terminology with knowledge base terms.

Figure 3:
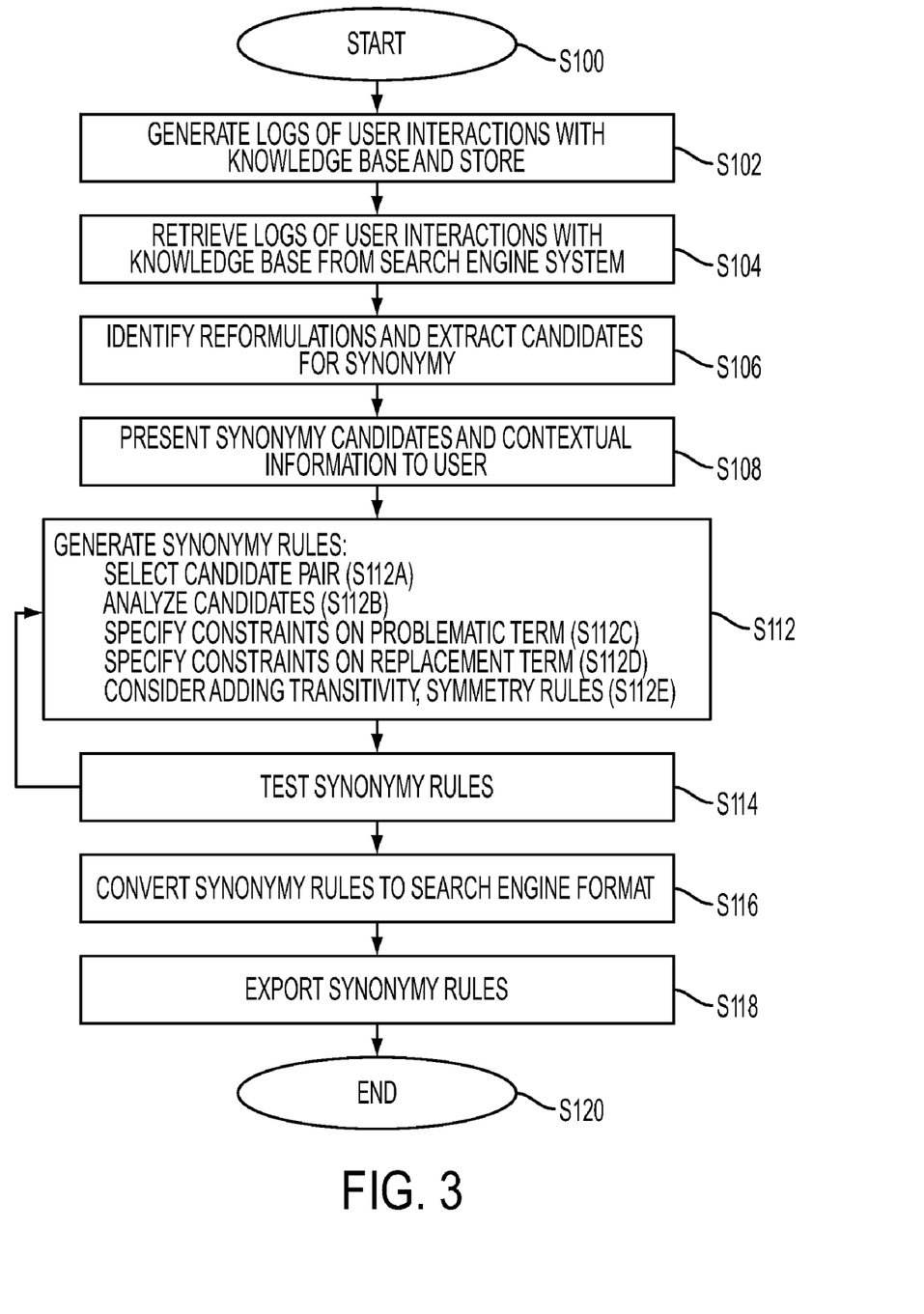
FIG. 3 illustrates steps of an exemplary method for generating candidate synonyms.

With reference now to FIG. 3, an exemplary method for generating synonymy rules which may be performed by the environment of FIG. 2 is shown. The method may include fewer, more, or different steps to those shown and need not proceed exactly as shown. The method begins at S100. At S102, logs 48 of user search sessions are generated. At S104, the logs are retrieved by the synonymy system 20. At S106, the logs are processed to identify query reformulations and extract candidates for synonymy therefrom, which are stored in data memory 52. At S108, contextual information 58 is extracted from the knowledge base. At S110, the candidates for synonymy 50 and relevant contextual information 58 are presented to a user for generation of proposed synonymy rules. At S112, synonymy rules are generated interactively, i.e., under the supervision of the editor. Alternatively, some or all the rules may be generated fully automatically and may be proposed to the editor. This step may include some or all of the following substeps: candidate pair selection (S112A), analysis of the candidate (S112B), constraint selection for problematic term (S112C), constraint selection for replacement term (S112D), and considering symmetric and transitive rules (S112E).

Optionally, at S114, the proposed rules may be tested by applying them to a new set of user queries. The generated rules are stored in data memory 52. Steps S112 and S114 may be repeated if the tests do not show an improvement over queries performed without the expansion rules.

At S116, the generated (and tested and approved) synonymy rules are converted to an appropriate format for execution by the search engine and (at S118) are exported to the search engine 40 and stored in the thesaurus 46 or other appropriate storage medium. Steps S104-S118 may be repeated at intervals, e.g., automatically and/or at the request of a user. The method ends at S120.

The method illustrated in FIG. 3 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 3, can be used to implement the method for generating query expansion rules.

Further details on the method and components of the exemplary synonymy system will now be provided.

Detection of Candidates for Synonymy (S106)

A single methodology or several different methodologies may be employed by the candidate detection module for identifying candidate synonymy pairs. Each methodology detects candidate synonymy pairs and may assign a quality score to each candidate. Where multiple methodologies are used, the candidates may be ranked according to a weighted sum of the scores assigned by the individual methodologies. Before candidates are presented to the editor, those falling below a threshold score may be automatically eliminated. The remaining candidates with scores at or above the threshold score may be ranked according to their scores, as described below.

As noted above, at least some of the candidate synonymy pairs are identified based on logs of past users' interactions with the knowledge base. In this embodiment, the logs are divided into sessions, each session corresponding to one or more queries input by a single user. The logs contain session information (e.g., information about when one user session ends and the next begins), so that queries issued by the same user within a short period of time can be grouped together. Using this information, reformulation frequencies are computed. Specifically, for each pair of terms (T1, T2), the frequency with which a query containing T1 is followed in the same session by another query that is identical except that T1 is replaced by T2 (the reformulation frequency) is computed. Each term T1 and T2 can comprise one or more words. In this method, the order of the words in the query and the positions of the identical terms are not taken into account. Thus, the reformulations XA→YA, XB→BY, CX→CY, DXE→YED, and X→Y where A, B, C, D, and E are different terms which are identical before and after reformulation, are all considered as instances of the same reformulation pair (X, Y) for purposes of computing frequency. In some embodiments, stop words (very common words such as 'a' or 'the' which generally are not helpful in formulating a query) are not taken into account.

For example, if a user submits the query "error code" and subsequently the query "fault code," this is counted as one occurrence of the reformulation error→fault. If another user makes the query "scanner error" and subsequently "scanner fault", this is counted as another occurrence of the same reformulation. If another user makes the query "the scanner error" and subsequently "scanner fault", this is counted as another occurrence of the same reformulation, since the stop word 'the' is ignored. The reformulation pairs are taken as synonymy candidates, and their reformulation frequencies, or some function thereof, are used as scores. As will be appreciated, what constitutes a reformulation could be defined in a different, e.g., more limited, manner than described above.

Reformulation pairs 50 whose replacement term (T2) does not occur in the knowledge base 44 may be filtered out, since using such pairs as query expansion synonyms would have no beneficial effect on search results.

In practice, many of the reformulations ranked highly by the exemplary methodology are corrections of spelling errors. If the query interface includes a spell checker/corrector that proposes correctly spelled versions of words misspelled in the user's query, then it is not useful to add detectable respellings as "synonyms". Accordingly, reformulations which are detected as being corrections of spelling errors may also be filtered out, e.g., ("configuration", "configuration"). To avoid proposing such pairs to the editor, the same type of spell checker is applied to the problematic term in each candidate pair. If the spell checker considers that the term is misspelled, and its suggested replacement is the candidate replacement term, then that pair is eliminated as a candidate.

Interactive Definition of Synonymy Rules (S112)

During the processing of a synonymy candidate (T1, T2), where T1 is the problematic term and T2, the replacement term, the editor has three choices:
  a. It is not useful to create a corresponding synonymy rule or it is potentially useful but would introduce too much noise-no rule is created.
  b. It is useful to create a simple synonymy rule stating that any query containing T1 should be matched with all results containing T2.
  c. It is useful to create a synonymy rule but with contextual restrictions.

In the first case, the editor can move the synonymy candidate (T1, T2) to a list of (optionally revocably) rejected candidates. In the second case, the editor can ask the synonymy system 20 to directly create the synonymy rule for (T1, T2). In the third case, the user may choose to explore the contexts 58 in which T2 appears in the knowledge base and may generate a synonymy rule specifying in which contexts the rule should apply. This evaluation allows the editor to specify the possible contexts of application of the synonymy. These contexts can be derived from the sentences in the knowledge base documents. For example, for the candidate ("error", "fault") the editor may observe that "error" is synonymous with "fault" but only within sentences where "fault" is associated with "code". Choosing some contexts corresponds to constraining the synonymy rule so that the rule will be applied only within those contexts. Or the editor may choose a negative constraint which applies the rule to all contexts except those specified. Constraints can be applied to the context of the problematic term, the replacing term, or both.

Analyzing the Candidates for Synonymy (S112B)

The synonymy candidates identified at S110 can be analyzed with respect to the impact of the corresponding synonymy rules when searching the knowledge base both from a quantitative and a qualitative point of view. Some or all the following information may be provided by the evaluation module 26 via the GUI, to assist the editor in formulating, refining, and/or rejecting synonymy rules, as illustrated in the exemplary screen shots shown in FIGS. 4-7. A first element of consideration for a candidate for synonymy (T1, T2) is the frequency of the replacement T1→T2 in the queries. Also, for a given candidate for synonymy (T1, T2), the reverse pair (T2, T1), in particular if detected in the reformulations, can be taken into consideration at the same time. The editor can study semantic aspects of a replacement by looking at (1) the queries where a reformulation T1→T2 has taken place, (2) the queries that contain T1 but which have not been reformulated, and (3) the set of sentences that would be retrieved from the knowledge base for queries containing T1 if the synonymy rule for T1→T2 were to be activated. Selecting a candidate for synonymy (T1, T2), the editor can see the results, that is, sentences in the knowledge base, that a search would retrieve for a given query using T1 if the synonymy rule for (T1, T2) were to be introduced. The set of retrieved sentences includes the set of the sentences containing T1 and the set of sentences containing T2 but not T1, i.e., the additional sentences retrieved by the synonymy rule when searching for T1 in the knowledge base. Each of these sets can be navigated by the editor. Occurrences of the words composing the replacing term are highlighted in the sentences. For each sentence, the system also shows complementary information about the document containing it, such as the document type (in this embodiment, a Solution, Problem, or Case), and title. Each set of sentences can be navigated by the editor. Also the editor can contextualize the terms T1 and/or T2 as described below.

Some quantitative measures on the occurrences of the problematic and replacing terms in the knowledge base may be presented to the editor via the GUI 64. These may provide further support for evaluating the impact of introducing a synonymy rule and may include one or more of:
  Number of documents in the knowledge base where the problematic term occurs;
  Number of documents in the knowledge base where the replacing term occurs;
  Number of sentences in the knowledge base containing each of the terms; and
  Number of sentences in the knowledge base containing the problematic term but not the replacing term and vice versa.

Specifying Contextual Constraints on the Problematic Term in Queries (S112C)

From a comparison of the two lists of queries where the problematic term of a candidate appears, i.e., the list of queries that have been reformulated, and the list of not reformulated queries, the user of the synonymy system 20 may decide that the problematic term should be made more specific. For example, with the candidate ("code", "password"), the queries where "code" was not reformulated as "password" may contain "area code" or "fault code" whereas the reformulated queries may contain "user code" or "admin code". A better candidate to consider for query expansion in this case would be ("user code", "password") or ("admin code", "password").

The user can select a new problematic term from the list of reformulated queries or manually enter a new term. This will result in the creation of a new candidate in the synonymy system that can be processed in the further steps described below similarly to the ones that were automatically detected.

Specifying Contextual Constraints on the Replacement Term in the Knowledge Base (S112D)

While editors could specify, for each possible query term, the list of knowledge base documents that are relevant to that term, such an approach is generally too time-consuming to be feasible in practice. In the exemplary embodiment, the synonymy system 20 groups documents according to the context in which a replacement term occurs and provides this information to the user via the GUI. Editors can then choose contexts in which the rule should apply, and this has the effect of specifying entire groups of documents as relevant to the problematic term.

In one embodiment, the contexts presented to the user are syntactically coherent expressions, which may be identified by the method described in F. Roulland, A. Kaplan, S. Castellani, C. Roux, A. Grasso, K. Pettersson, J. O'Neill, "Query Reformulation and Refinement Using NLP-Based Sentence Clustering", in Proc. of the 29th European Conference on Information Retrieval (ECIR), 2-5 Apr. 2007, Rome, Italy;

and in U.S. application Ser. Nos. 11/544,200, 11/805,456, and 11/875,183, incorporated herein by reference in their entireties.

This method uses the parser 62 to segment a text (e.g., a sentence of a document in the knowledge base) into a sequence of syntactically coherent expressions. The granularity of the segmentation is defined such that expressions are typically quite short (a few words), so that there is a high probability of the same expression being found in multiple documents, yet long enough that each expression makes sense as a choice in a query refinement process. For example, the sentence fragment "image area partially blank when printing and copying" may be segmented as follows: image area/partially blank/when printing and copying. Some normalization (stop word removal and lemmatization) is applied, to increase the frequency with which equivalent expressions are found in multiple documents. Thus, two sentences in the knowledge base including the expressions: 'image area' and 'the image areas', respectively, may be grouped into the same context, which may be represented by the expression 'image area'. Similarly, instances of the expressions 'when printing and copying' and 'when it is printed and copied' may be grouped into the same context, which may be represented by the expression 'when printing and copying'.

When the editor wishes to specify that a synonymy rule applies only when the replacement term is found in certain contexts in the knowledge base, the synonymy system may propose, as contexts, all the syntactically coherent expressions that occur in the knowledge base and which contain the replacement term. For example, consider the pair ("handler", "feeder"). The replacement term feeder may be found in the expressions automatic document feeder (the part of the copier that handles stacks of originals) and high capacity feeder (a tray that holds blank paper). The editor can specify, for example, that queries for handler should retrieve all documents containing automatic document feeder, but not documents containing high capacity feeder.

Figure 8A:
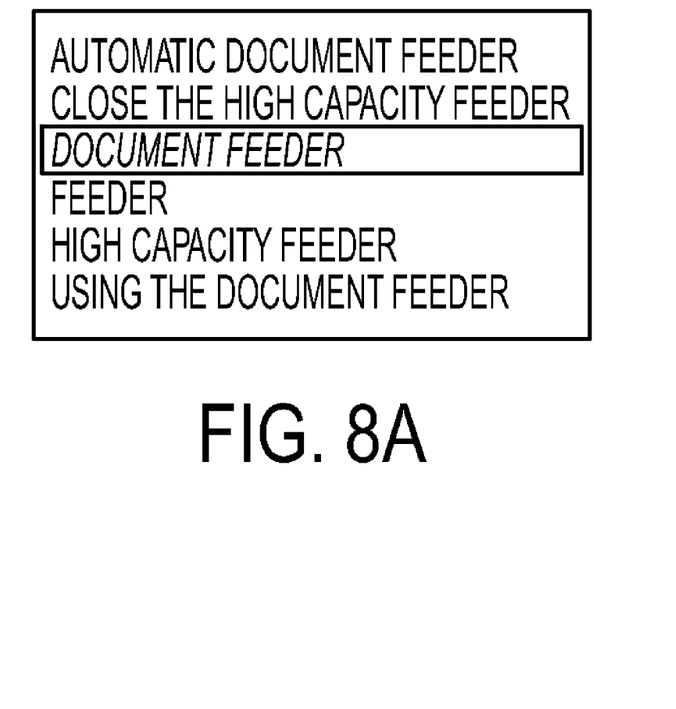
FIG. 8 illustrates two examples of context presentation (flat list and tree).
Figure 8B:
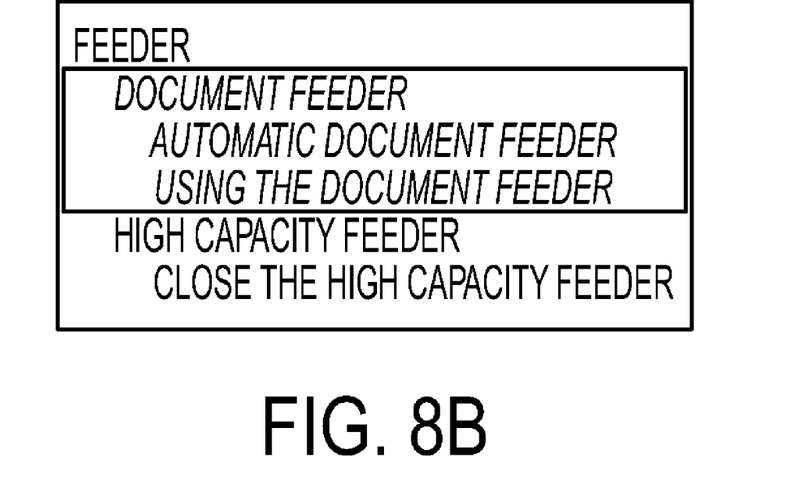

Contexts may be presented simply as a list or in a more structured way as a collapsible tree organized by subsumption. For example, FIG. 8 shows the two alternatives for representing the contexts found for the term feeder occurring in the expressions automatic document feeder, high capacity feeder, document feeder, using the document feeder, and close the high capacity feeder. In the tree representation, selecting document feeder has the effect of selecting all documents containing either document feeder as a self-contained expression or automatic document feeder; the context automatic document feeder would still be available as a choice, but as a refinement of document feeder rather than as a separate choice.

In one embodiment, the editor may be permitted to add contexts that are not currently in the knowledge base. Thus, the synonymy rule may cover those contexts for future applications of the synonymy rule.

Considering Symmetric and Transitive Rules (S112E)

In the exemplary method described above, each candidate for synonymy 50 is treated as an asymmetric pair (T1, T2) consisting of a problematic term T1 to be found in queries and a replacement term T2 to be found in the knowledge base 44. The method thus produces unidirectional synonymy rules 56 where the presence of T1 in a user query will retrieve sentences in the knowledge base containing the term T2, which may be limited to specific contexts where T2 appears. In some cases, it may be desirable to consider the reverse pair (T2, T1) as well, either because the candidate detection module 22 finds independent evidence for it, or because the editor knows that the two words are truly equivalent. To support this, after a rule has been created from a candidate, the synonymy system can generate the list of additional candidates that can exist by symmetry. These are, for a rule where a term T1 will match T2 in the contexts C1T2 and C2T2, the new candidate pairs (T2, T1), (C1T2, T1), (C2T2, T1). For example, if for the candidate ("SMTP", "email") the user generates the rule: "SMTP"→"email" {"server"|"setup"} which implies that the problematic term "SMTP" can be replaced by "email," only in the contexts "email server" and "email setup," then the synonymy system may propose the following additional candidates: ("email", "SMTP"), ("email server", "SMTP") and ("email setup", "SMTP").

In a similar way, the synonymy system 20 may generate a list of additional candidate pairs considering the potential transitivity between synonymy rules. For example, assuming that the two rules A→BC and C→D are validated where BC is a term that contains the term C, then the rule A→BD can be proposed for validation. New candidates can be found to extend the list of rules in two ways:

1. Candidates based on extension of a new rule by transitivity of previously entered rules.
2. Candidates based on extension of a previously entered rule by transitivity of a new rule.

For example, if the rule "smtp"→"email server" already exists and the user generates the additional rule "email"→"e-mail", the synonymy system may propose, by transitivity, the candidate ("smtp", "e-mail server").

Each of the new candidates can be analyzed by the user like other candidates and can lead to the generation of additional synonymy rules. This process can be applied recursively until no more candidates can be suggested from the synonymy system through the analysis of symmetric or transitive relations between existing rules. Once this process is finished the user returns to the analysis of the initial list of candidates that has been produced by the detection module.

The User Interface

Figure 4:
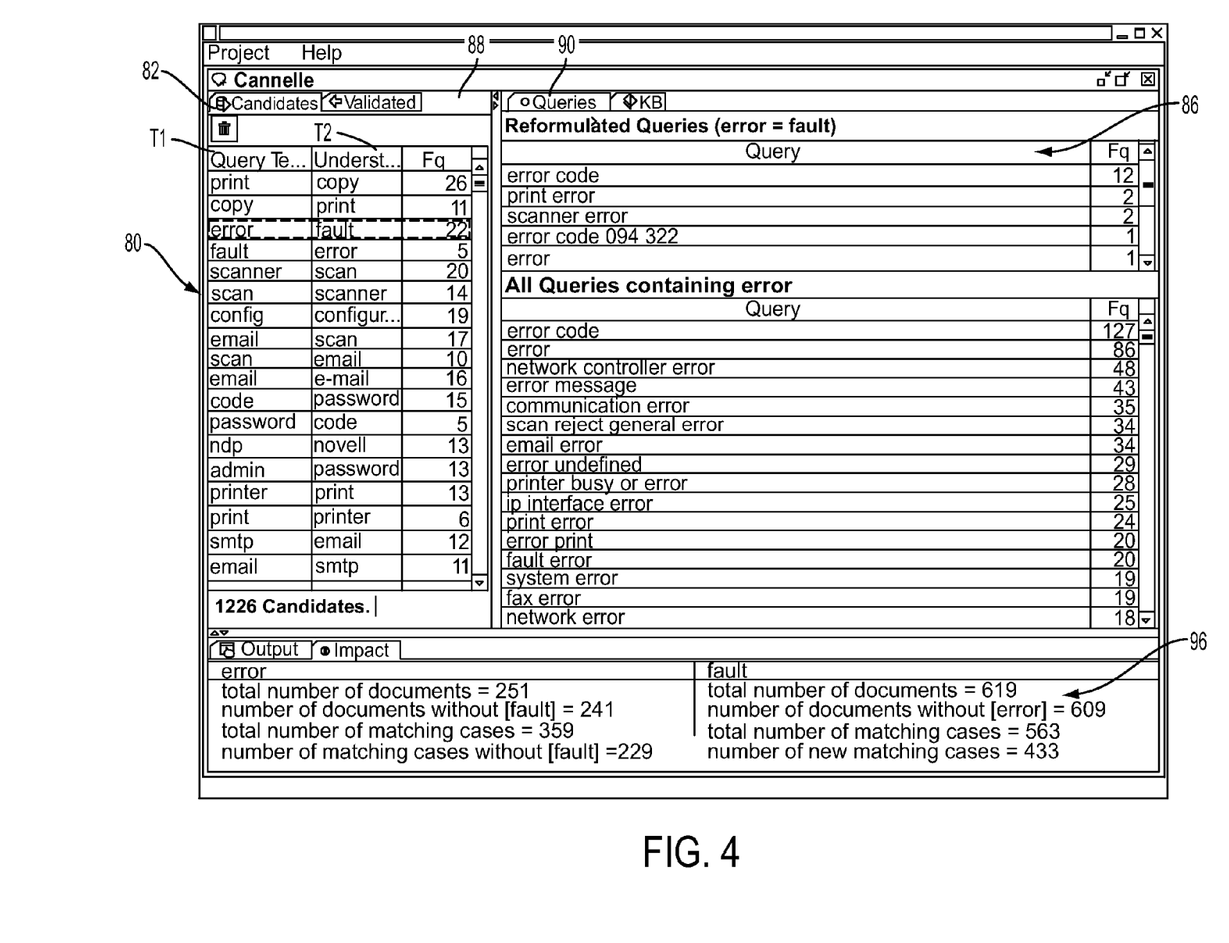
FIG. 4 is a screen shot of an exemplary user interface displaying a list of reformulation pairs, ranked by frequency of occurrence.

FIG. 4 illustrates a screen shot of an exemplary GUI 64 displaying exemplary results generated from query reformulations in user sessions with a troubleshooting knowledge base 44 for a printer. A list 80 of candidates for synonymy is displayed, which can be accessed using a 'Candidates' tab 82. For each candidate for synonymy (T1, T2) the interface 64 shows the frequency (Fq) of the replacement T1→T2 in the queries and, immediately below in the list 80, its reverse T2→T1, if one is available. In some embodiments, candidates may be grouped alphabetically by problematic term so that the editor is aware of the potential synonyms associated with a given problematic term and create synonymy rules accordingly. FIG. 4 shows an example where the editor has selected the synonymy candidate ("error", "fault") from the list 80 of synonymy candidates.

Figure 5:
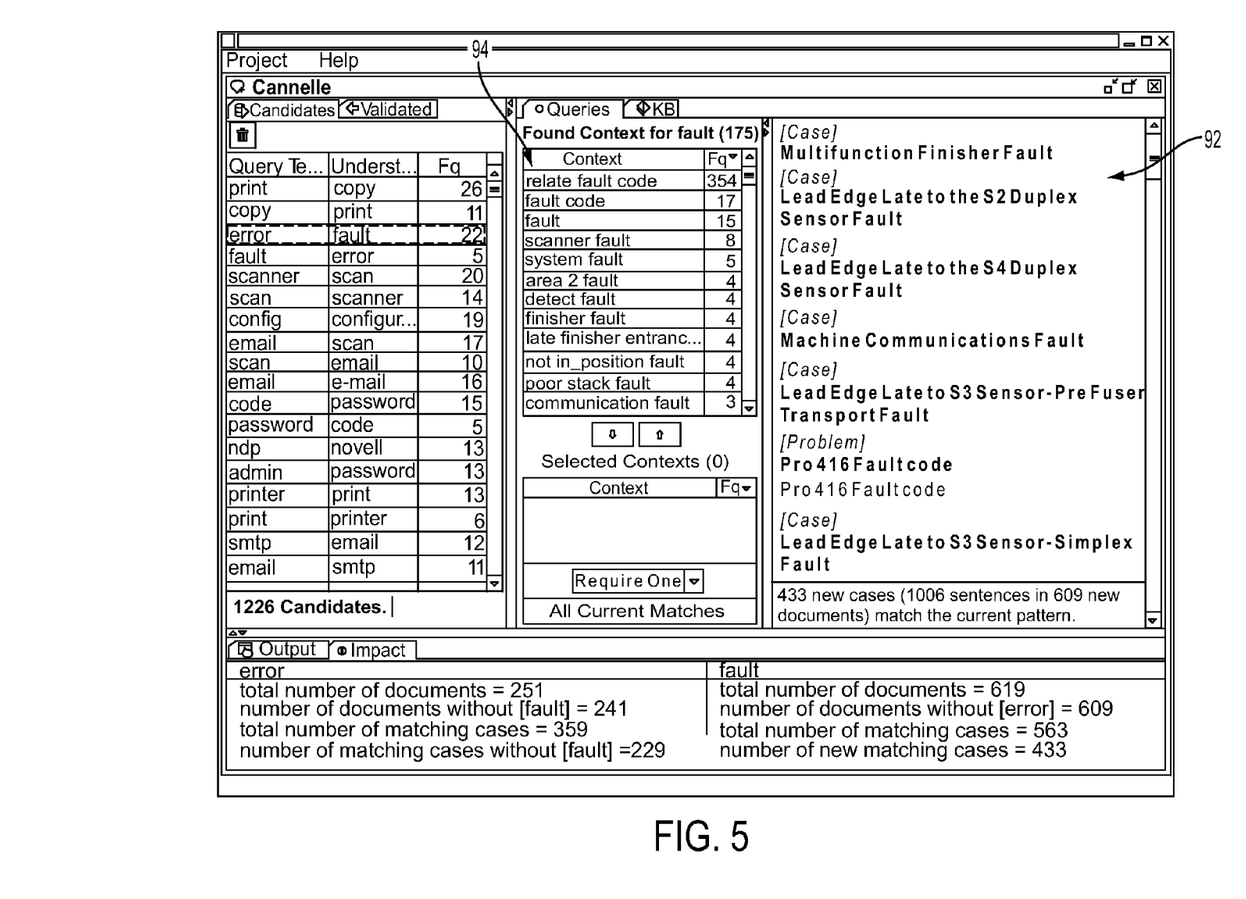
FIG. 5 is a screen shot of the exemplary user interface displaying a list of contexts which include the reformulation "fault" and a set of sentences in the knowledge base.

Upon selecting a synonymy candidate (T1, T2), the editor can see, in the area 86, a list of the queries where the reformulation T1→T2 has taken place and the queries where T1 occurred (e.g., by actuating a "Queries" tab 88). The editor can also see the sentences in the knowledge base that a search would bring for a query including T1 if the synonymy rule for (T1, T2) was introduced (e.g., by selecting the "knowledge base" tab 90). The set of retrieved sentences displayed may be the set of sentences containing T2 but not T1. For example, FIG. 5 shows, for the ("error", "fault") candidate, the set 92 of sentences retrieved from the knowledge base 44 containing "fault" but not "error". These are the sentences that would be added to the previous results if the synonymy rule for ("error", "fault") was introduced. Occurrences of the words composing the replacing term are highlighted, e.g., in bold or a contrasting color.

Figure 6:
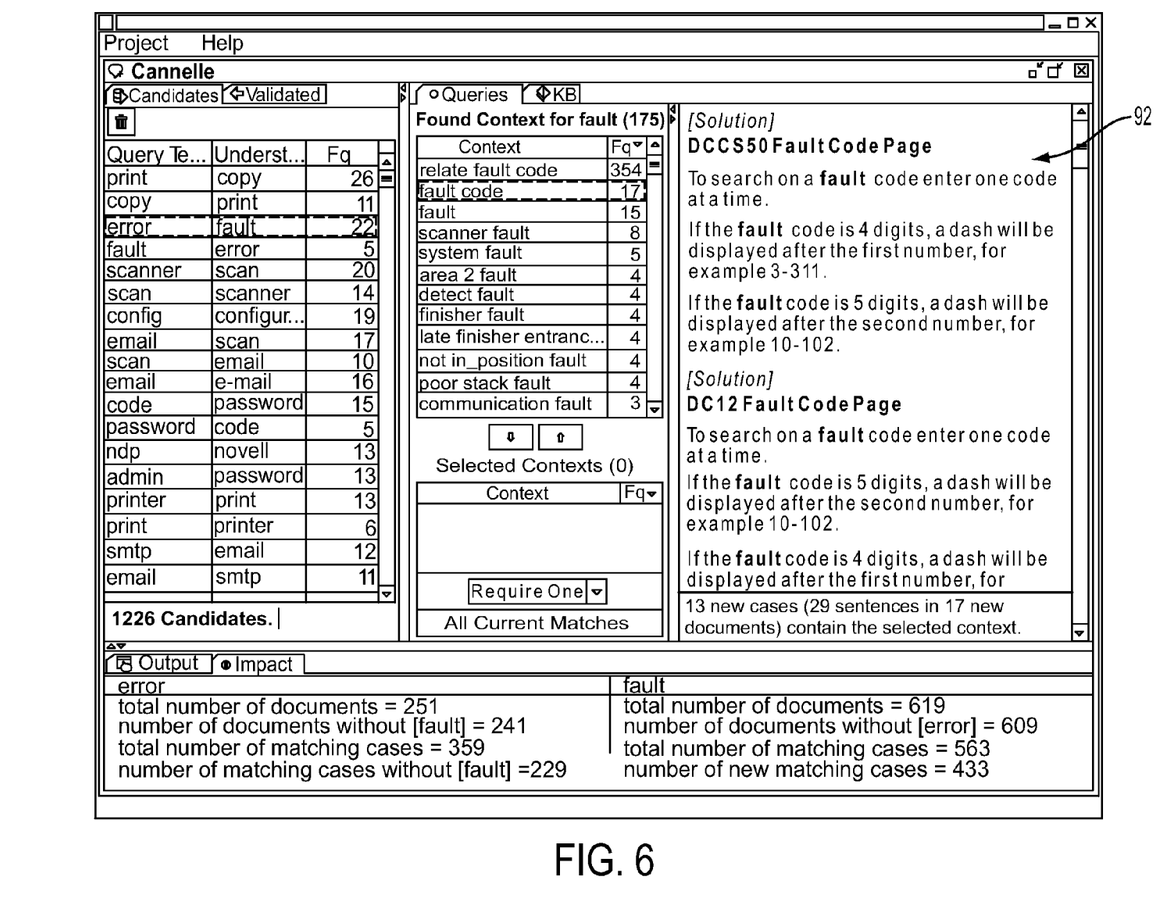
FIG. 6 illustrates the effect of selecting one of the presented contexts.
Figure 7:
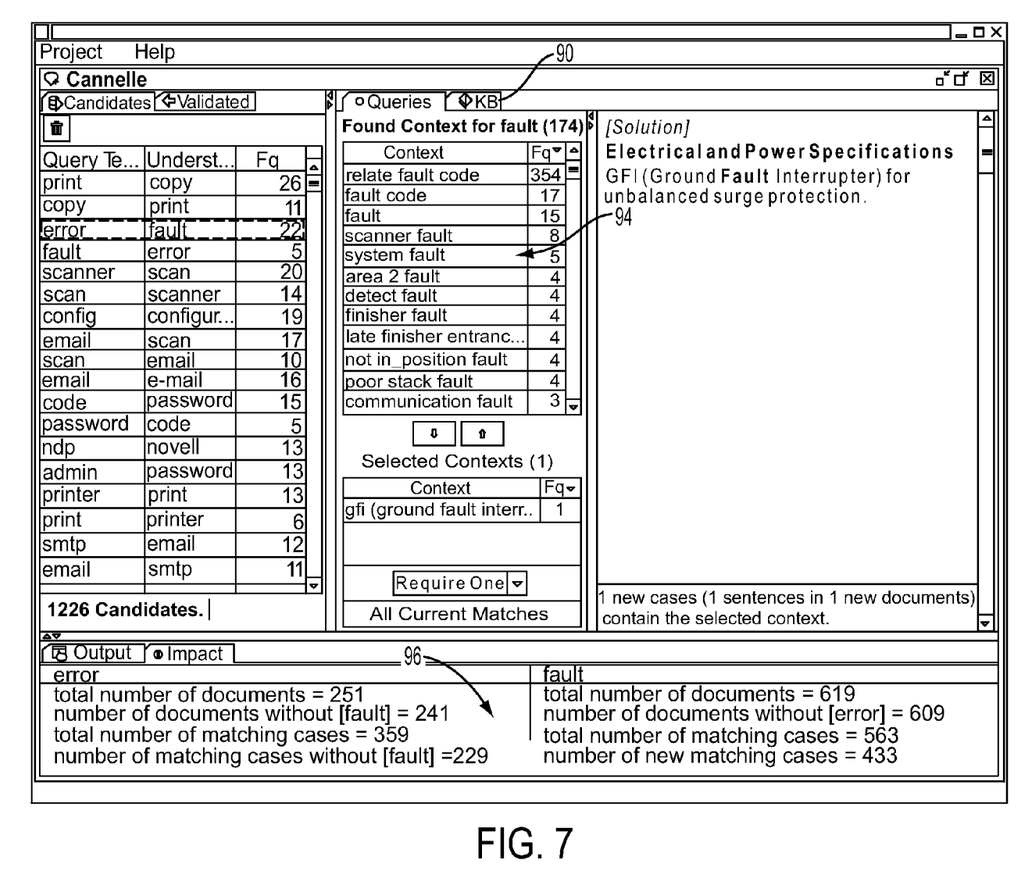
FIG. 7 illustrates an example of a selection of a negative context.

In area 94, the expressions found for the replacing term in the sentences retrieved from the knowledge base are displayed. These expressions can be used to specify the contexts in which the synonymy rule should be applied. By selecting an expression, the editor can see what the associated sentences are and then he can require it as a context of application for the synonymy rule (by clicking on "Require One"). Several contexts can be specified, thus defining the set of contexts where the rule should apply. For example, as shown in FIG. 6, for "fault" the editor can select the context "fault code" in order to define a synonymy rule according to which "error" is synonymous with "fault" only when "fault" is followed by "code".

In another embodiment, the editor can specify that the selected expressions define the contexts where the synonymy should not apply. For example, in FIG. 7, a user has decided to exclude the case where "fault" occurs in the context of "gfi (ground fault interrupter)".

The lower area 96 provides quantitative measures on the occurrences of the problematic and replacing terms in the knowledge base. In this embodiment, the searchable knowledge base is structured into cases. Each case includes a description of a known problem and a set of one or more solutions for this problem. The figures provided by the system are therefore in terms of cases (that reflect the impact on the first visible results of the search) but also as a complement, in terms of documents where a document represents either a solution or a problem description.

During the evaluation, the editor can decide to generate a synonymy rule corresponding to a selected synonymy candidate (T1,T2). If the editor requests the creation of a synonymy rule, the synonymy system creates it according to the selected contexts, if any have been selected by the editor. The rule may be expressed in the XIP formalism. Moreover, the editor can specify whether the rule should be bi-directional, that is if it should apply in both T1→T2 and T2→T1 directions.

Once the synonymy rule has been defined, the editor may request that the synonymy system 20 inserts the rule into the knowledge base 44. In this case, re-indexing of the contents of the knowledge base may be performed, taking into account all the synonymy rules. As will be appreciated, it is not necessary to re-index the knowledge base content since the search engine can simply apply the new synonymy rules to subsequent queries.

In summary, the exemplary embodiment provides a method and synonymy system for semi-automatic creation and maintenance of query expansion (synonymy) rules where candidates for synonymy are identified from expressions used by users in queries when searching the knowledge base. These candidates take the form of (problematic term, replacing term) pairs where both problematic and replacing terms are derived from reformulations in user queries. The candidates can be contextualized and evaluated in terms of their impact on search results. Contextual, multi-word synonymy rules can be incrementally generated from these candidates and applied to the targeted search engine if the knowledge base editors, who are the typical users of such a synonymy system, decide to do so.

Without intending to limit the scope of the exemplary embodiment, an evaluation of an exemplary synonymy system will now be described.

EXAMPLE

An evaluation of a prototype synonymy system 20, configured as described above, was performed with the objective of estimating the capability of the synonymy system for generating synonymy rules that may improve the quality of the documents retrieved by a search engine.

In the evaluation, synonymy candidates were automatically identified from a set of user session logs. A set of synonymy rules was manually created from the evaluation of the best candidates using a user interface as illustrated in FIGS. 4-7. An estimation of the impact of these synonymy rules in terms of the number of sessions where the rules would apply was then performed using additional session data that were not used for candidate extraction. An estimation of the impact of the synonymy rules in terms of quality of results retrieved when the rules are activated was performed, by comparing the results obtained with and without synonymy rules, respectively, on a sample of 100 unique queries extracted from user sessions logs.

For this evaluation, user interaction logs from an online troubleshooting system for printers that had been collected for the period between January and October of a particular year were employed. The interaction logs for the troubleshooting system describe the queries entered by the users, the links they followed to specific sentences, describing known problems with a printer, and/or associated solutions for those problems, and an indication of how each session ended, e.g., whether the session ended on a problem description page.

The extraction of the synonymy candidates was performed by applying the methodology described above to the collected user interaction logs (i.e., by considering, as a reformulation, that part of subsequent query which differs from a prior query in the same session, irrespective of the order of the words in the query and ignoring stop words).

Of the resulting list of synonymy candidates, 80 candidate pairs (T1, T2) were then evaluated, including the most frequent candidates and their reverses, by one or two evaluators. The evaluation first included determining whether the candidates corresponded to desirable query expansion rules or not and if desirable, whether the rules needed to be restricted to certain contexts. As a result, 57 candidates were approved, three additional synonymy rules were identified, and the corresponding synonymy rules generated, as follows:
37 rules without context
23 rules with context(s)
3 with only query context(s)
13 with only knowledge base context(s)
7 with both query and knowledge base contexts The evaluation resulted in 3 of the candidates being considered redundant with respect to rules generated for previous candidates. Three additional synonymies were identified.

Example synonymy rules are given in Table 1.

TABLE 1

| Problematic term: Replacing term | Query context | knowledge base context |
|---|---|---|
| scanner:scan | | |
| scan:scanner | | |
| error:fault | | fault NOT followed by {interrupter} |
| fault:error | | |

TABLE 1-continued

| Problematic term: Replacing term | Query context | knowledge base context |
|---|---|---|
| config:configuration | | |
| email:e-mail | | |
| code:password | {admin \| invalid \| access} code | |
| password:code | | {activation \| admin \| access \| account \| administrator} code |
| printer:print | printer {driver \| service \| device} | print {driver \| service \| device} |
| print:printer | print {driver \| service \| device} | printer {driver \| service \| device} |
| smtp:email | | email {server \| setup \| settings} |
| email:smtp | | |
| tray:paper | | paper {supply \| source} |

In TABLE 1, the first column describes the synonymy candidate (problematic term, replacing term), e.g. ("printer", "print"). The second column indicates restrictions on the context of the problematic term in the query, e.g., "code" is a synonym of "password" if "admin" or "invalid" or "access" is also in the query. The third column indicates restrictions on the context of the replacing term in the retrieved text. The contextualization can be "positive", e.g. "tray" is a synonym of "paper" followed by "supply" or "source"; or it can be negative, e.g. "error" is a synonym of "fault" where "fault" is not followed by "interrupter".

The evaluation further included analyzing the impact of the generated synonymy rules on the user sessions collected for November and December of the same year. A measurement was made of how many of these sessions the synonymy rules would have applied and the quality of their application evaluated. For the evaluation of the quality, the set of the first queries of the sessions where the rules would apply were considered. Then, 100 unique queries were selected and for each of these, two different evaluators compared documents retrieved by a search engine without and with synonymy rules activated, respectively.

Results were as follows:

Estimation of percentage of sessions where synonymy rules identified using the synonymy system would apply: 38%

Estimation of impact of rules in terms of quality:

16% of queries in the sample: quality of retrieved documents significantly improved 84% of queries in the sample: no significant change 0% of queries in the sample: significant loss of quality The results of these tests show it can be expected that the use of the synonymy system can improve the number of better handled queries while assuring little or no loss of quality.

Although the exemplary prototype described in this example was used for the generation of a thesaurus using the synonymy system and method within the troubleshooting domain, it will be appreciated that the same method could be used with knowledge bases in other domains where there is the need for the creation of a domain-specific thesaurus.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A semi-automated system for generating query expansion rules comprising:

memory which stores:

a candidate detection module, which automatically extracts candidate synonymy pairs from expressions used by users in queries when searching an associated knowledge base, the user queries being grouped into user sessions based on session information, each user session including a first user query input by a user and a subsequent reformulated user query input by the same user, the candidate detection module generating each synonymy pair from a term of a first user query input by a user and a term of a reformulated user query input by the same user in the same user session;

an interactive definition module for defining synonymy rules based on the extracted candidate synonymy pairs; and a synonymy rule export module which exports query expansion rules based on the defined synonymy rules to a storage medium for use in expansion of user queries when searching the knowledge base; and a computer processor which executes the modules.

2. The system of claim 1, wherein the candidate detection module automatically generates a synonymy pair comprising a first term and a second term, the first term being present in the first query input by the user and absent from the reformulated query input by the user and the second term being present in the reformulated query and absent from the first query.

3. The system of claim 2, wherein the interactive definition module is configured for filtering out synonymy pairs generated automatically by the candidate detection module where the second term is absent from the knowledge base.

4. The system of claim 2, wherein some of the synonymy rules each include a synonymy pair and a context restriction for the synonymy pair.

5. The system of claim 4, wherein the interactive definition module is configured for generating a candidate context for generating the context restriction, the candidate context for the restriction being based on at least one of:

a query term which is present in at least one query with the first term;

a knowledge base term which is present in the knowledge base in association with the second term.

6. The system of claim 1, further comprising a user interface whereby the interactive definition module interacts with an editor for definition of the synonymy rules.

7. The system of claim 1, further comprising an evaluation module which applies the synonymy rules to a set of prior user sessions to assist an editor in evaluating the synonymy rules in terms of their impact on search results.

8. The system of claim 1, wherein the candidate detection module computes reformulation frequencies for each of a set of the candidate synonymy pairs and filters out candidate synonymy pairs which are below a threshold reformulation frequency, the reformulation frequency being the frequency with which a query containing a term T1 is followed in the same session by another query that is identical except that term T1 is replaced by a term T2 and optionally ranks candidate synonymy pairs based on their reformulation frequencies.

9. In combination, a search engine system and the system of claim 1, the search engine system comprising a search engine which generates logs of user sessions with the knowledge base and the storage medium which stores the query expansion rules exported by the export module.

10. A method for generating query expansion rules comprising generating at least one query expansion rule with the system of claim 1.

11. The system of claim 1, wherein the interactive definition module provides for interactive contextualizing of the synonymy rules.

12. A method for generating query expansion rules comprising:
   with a computer comprising memory and a computer processor:
      automatically extracting candidate synonymy pairs from expressions used by users in queries when searching a knowledge base, the user queries being grouped into user sessions based on session information, each user session including a first user query input by a user and a subsequent reformulated user query input by the same user,
      wherein the extracting includes generating each candidate synonymy pair from a term of a first user query input by a user and a term of a reformulated user query input by the same user in the same user session;
      providing for interactive definition of synonymy rules based on the extracted candidate synonymy pairs and for contextualizing the synonymy rules; and
      exporting query expansion rules based on the defined synonymy rules to a storage medium for use in expansion of user queries when searching the knowledge base.

13. The method of claim 12, wherein the first term is present in the first query and absent from the reformulated query and the second term is present in the reformulated query and absent from the first query.

14. The method of claim 12, further comprising filtering out synonymy pairs where the second term is absent from the knowledge base.

15. The method of claim 12, further comprising filtering out candidate synonymy pairs for which a reformulation frequency is below a threshold.

16. The method of claim 12, wherein the defining of the synonymy rules includes generating, for at least one of the extracted candidate synonymy pairs, a context restriction, the synonymy rule comprising the candidate pair and the context restriction.

17. The method of claim 16, wherein the context restriction is generated interactively by an editor.

18. The method of claim 16, further comprising automatically generating a candidate context for generating the context restriction, the candidate context being based on at least one of:
   a common term which is present in both the first query and second query; and
   a knowledge base term which is present in the knowledge base in association with the second term.

19. The method of claim 16, further comprising presenting candidate contexts and candidate pairs to an editor for definition of the synonymy rules.

20. The method of claim 12, further comprising evaluating the synonymy rules in terms of their impact on search results.

21. The method of claim 12, further comprising, after a synonymy rule has been defined:
   automatically inferring an additional candidate synonymy rule based on at least one of:
      symmetry of the defined synonymy rule, and
      transitivity of the defined synonymy rule with another synonymy rule; and
   presenting the additional candidate synonymy rule to an editor for evaluation.

22. The method of claim 12, further comprising:
   applying a query expansion rule based on the defined synonymy rule to a new user query when searching the knowledge base.

23. A computer program product comprising a non-transitory recording medium encoding instructions, which when executed on a computer causes the computer to perform a method for generating query expansion rules comprising:
   automatically extracting candidate synonymy pairs from expressions used by users in queries when searching a knowledge base, the user queries being grouped into user sessions based on session information, each user session including a first user query input by a user and a subsequent reformulated user query input by the same user, the extracting including generating each candidate synonymy pair from a term of a first user query input by a user and a term of a reformulated user query input by the same user in the same user session;
   providing for interactive definition of synonymy rules based on the extracted candidate synonymy pairs and for contextualizing the synonymy rules; and
   exporting query expansion rules based on the defined synonymy rules to a storage medium for use in expansion of user queries when searching the knowledge base.

* * * * *